US012305596B2

(12) United States Patent
Matsunaga et al.

(10) Patent No.: US 12,305,596 B2
(45) Date of Patent: May 20, 2025

(54) GENERATOR

(71) Applicant: HONDA MOTOR CO., LTD., Tokyo (JP)

(72) Inventors: Yoshihiro Matsunaga, Wako (JP); Kohei Kawano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/693,271

(22) PCT Filed: Sep. 29, 2021

(86) PCT No.: PCT/JP2021/035893

§ 371 (c)(1),
(2) Date: Mar. 19, 2024

(87) PCT Pub. No.: WO2023/053275

PCT Pub. Date: Apr. 6, 2023

(65) Prior Publication Data

US 2024/0384695 A1 Nov. 21, 2024

(51) Int. Cl.
*F02M 37/00* (2006.01)
*F02B 63/04* (2006.01)

(52) U.S. Cl.
CPC ......... *F02M 37/0011* (2013.01); *F02B 63/04* (2013.01)

(58) Field of Classification Search
CPC ..... F02M 37/0011; F02M 37/00; F02B 63/04; F02B 63/048
See application file for complete search history.

(56) References Cited

U.S. PATENT DOCUMENTS 4,721,070 A * 1/1988 Tanaka .................... F02B 63/04
290/1 B
5,632,251 A * 5/1997 Ishikawa ............ F02M 25/0854
123/519

(Continued)

FOREIGN PATENT DOCUMENTS

JP 07-309277 A 11/1995
JP 2008-267348 A 11/2008

(Continued)

OTHER PUBLICATIONS

International Search Report dated Nov. 30, 2021, Application No. PCT/JP2021/035893; 4 pages.

(Continued)

*Primary Examiner* — Pedro J Cuevas
(74) *Attorney, Agent, or Firm* — Rankin, Hill & Clark LLP

(57) ABSTRACT

A generator that suppresses leakage of a liquid fuel. The generator includes a fuel tank that stores the liquid fuel. The fuel tank has a fuel inlet and a breather path formed of a pipe member communicating between an inside and an outside of the fuel tank. An isolated body forms an isolated space that is isolated from an internal space of the fuel tank is provided inside the fuel tank. The isolated body is provided with a breather room and a chamber room that are formed by partitioning the isolated space by a partition wall. A ventilation hole allows the internal space and the chamber room to communicate with each other. An inflow hole allows the breather room and the chamber room to communicate with each other. An end part on one side of the pipe member is disposed inside the breather room.

4 Claims, 7 Drawing Sheets

(56) References Cited

U.S. PATENT DOCUMENTS

| | | | | |
|---|---|---|---|---|
| 5,868,119 | A * | 2/1999 | Endo | F02M 33/02 123/520 |
| 2008/0264501 | A1 | 10/2008 | Miyazaki et al. | |
| 2011/0233225 | A1* | 9/2011 | Goto | B60K 15/073 220/746 |
| 2014/0026828 | A1 | 1/2014 | Kojima et al. | |
| 2017/0334286 | A1 | 11/2017 | Tanaka | |
| 2021/0340903 | A1 | 11/2021 | Kojima et al. | |

FOREIGN PATENT DOCUMENTS

| | | | |
|---|---|---|---|
| JP | 2014-025456 | A | 2/2014 |
| JP | 2017-210033 | A | 11/2017 |
| JP | 2021-088958 | A | 6/2021 |
| WO | 2020/049697 | A1 | 3/2020 |

OTHER PUBLICATIONS

International Preliminary Report on Patentability issued on Apr. 20, 2022; Application No. PCT/JP2021/035893; 6 pages.

Notification of Transmittal of Translation of the International Preliminary Report on Patentability corresponding to International Application No. PCT/JP2021/035893, 4 pages.

* cited by examiner

GENERATOR

TECHNICAL FIELD

The present invention relates to a generator.

BACKGROUND ART

There has conventionally been a generator, as a work machine, which generates power using a liquid fuel stored in a fuel tank. Some generators of such kind include a fuel tank that stores a liquid fuel and a breather path communicating between an inside and an outside of the fuel tank. In such generators, the vaporized fuel generated inside the fuel tank can be discharged to the outside via the breather path (see, for example, Patent Literature 1).

CITATION LIST

Patent Literature

Patent Literature 1

Japanese Patent Laid-Open No. 2014-25456

SUMMARY OF INVENTION

Technical Problem

However, in the conventional configuration, there is a possibility that when a generator topples over, a liquid fuel may leak to the outside of a fuel tank via a breather path.

The present invention provides a generator capable of suppressing leakage of a liquid fuel.

Solution to Problem

The present invention is a generator including a fuel tank that stores a liquid fuel, the fuel tank having a fuel inlet and a breather path formed of a pipe member communicating between an inside and an outside of the fuel tank, in which an isolated body forming an isolated space that is isolated from an internal space of the fuel tank is provided inside the fuel tank, the isolated body is provided with a breather room and a chamber room that are formed by partitioning the isolated space by a partition wall, a ventilation hole allowing the internal space and the chamber room to communicate with each other, and an inflow hole allowing the breather room and the chamber room to communicate with each other, and an end part on one side of the pipe member is disposed inside the breather room.

Advantageous Effects of Invention

According to the present invention, leakage of a liquid fuel can be suppressed.

DESCRIPTION OF EMBODIMENT

Figure 1:
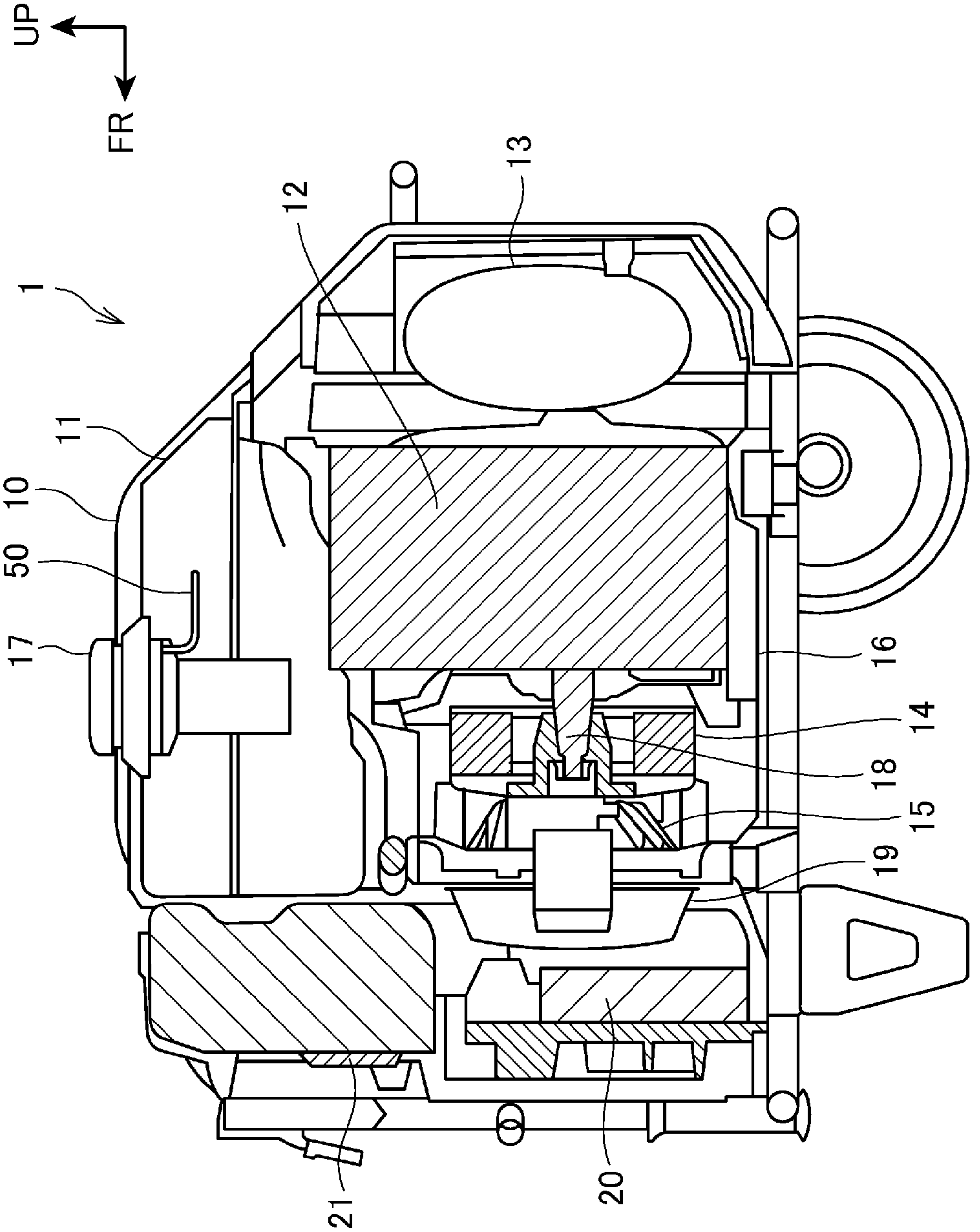
FIG. 1 is a configuration view of a generator according to the present embodiment.

FIG. 1 is a configuration view of a generator 1.

The generator 1 includes an outer casing 10. Inside the outer casing 10, a fuel tank 11, an engine 12, a muffler 13, an alternator 14, a fan 15, and a shroud 16 are disposed.

The fuel tank 11 includes a fuel inlet that can be accessed from an outside, and a liquid fuel can be put into the fuel tank 11 through the fuel inlet. A fuel inlet cap 17 is removably mounted on the fuel inlet.

The engine 12 is an ignition air-cooled engine driven by the liquid fuel inside the fuel tank 11. The engine 12 includes a cylinder, a piston that reciprocates inside the cylinder, and a crankshaft 18 that is coupled to the piston through a connecting rod.

An intake pipe connected to the engine 12 is provided with a throttle valve and a fuel supply device. Air of which the volume is adjusted by the throttle valve and fuel supplied from the fuel supply device are mixed, and this air-fuel mixture is supplied to the engine 12. The engine 12 combusts the air-fuel mixture in a combustion chamber to drive the piston and thereby rotates the crankshaft 18 through the connecting rod.

The muffler 13 is connected to an outlet of an exhaust pipe connected to the engine 12. The muffler 13 serves purposes such as reducing the exhaust pressure.

The fuel to drive the engine 12 may be gasoline or may be a fuel other than gasoline. The fuel supply device may have a configuration using an injector or a configuration using a carburetor.

The generator 1 includes a control unit. The control unit has a processor, such as a central processing unit (CPU), and a memory, such as a read-only memory (ROM). The control unit controls parts of the generator 1 as the processor executes a program stored in the memory. The control unit functions as, for example, an electronic control unit (ECU) that outputs control signals for controlling the output of the engine 12.

The alternator 14 is mounted to the crankshaft 18 of the engine 12. The alternator 14 is a multipolar alternator that is driven by the engine 12 to generate alternating-current electricity. The alternator 14 has a rotor that rotates integrally with the crankshaft 18, and a stator that is disposed concentrically with the rotor so as to face a circumferential surface of the rotor.

The rotor is provided with a permanent magnet. The stator is provided with U-phase, V-phase, and W-phase windings that are disposed at a phase angle of, for example, 120 degrees to one another.

The fan 15 is mounted on the crankshaft 18. On the crankshaft 18, a starting device 19 for starting the engine 12 is disposed. When the engine 12 is driven, electricity is generated by the alternator 14. When the engine 12 is driven, the fan 15 rotates, sending cooling air to the engine 12. The alternator 14 generates alternating-current electricity.

The shroud 16 includes an opening used for ventilation taking in air. The shroud 16 covers the alternator 14 and the fan 15 and thereby guides the air sent by the fan 15 to the periphery of the engine 12.

The outer casing 10 includes an intake port through which outside air is taken in and an exhaust port through which air having cooled the engine 12 is discharged.

The generator 1 includes an inverter 20. The inverter 20 controls the voltage and the frequency of the alternating-current electricity generated by the alternator 14 so as to stabilize the output.

The generator 1 further includes a control panel 21. The control panel 21 is provided with an electrical outlet, an operating switch, and others.

The electrical outlet is supplied with alternating-current electricity from the inverter 20. A plug of a device that uses generated electricity is connected to the electrical outlet. Alternatively, the electrical outlet may be supplied with direct-current electricity.

In FIG. 1, for the directions in a state of the generator 1 being installed for use, the upper side is denoted by reference sign UP and the front side is denoted by FR. Hereinafter, the state of the generator 1 being installed for use is referred to as an installed state.

Next, the fuel tank 11 will be described.

Figure 2:
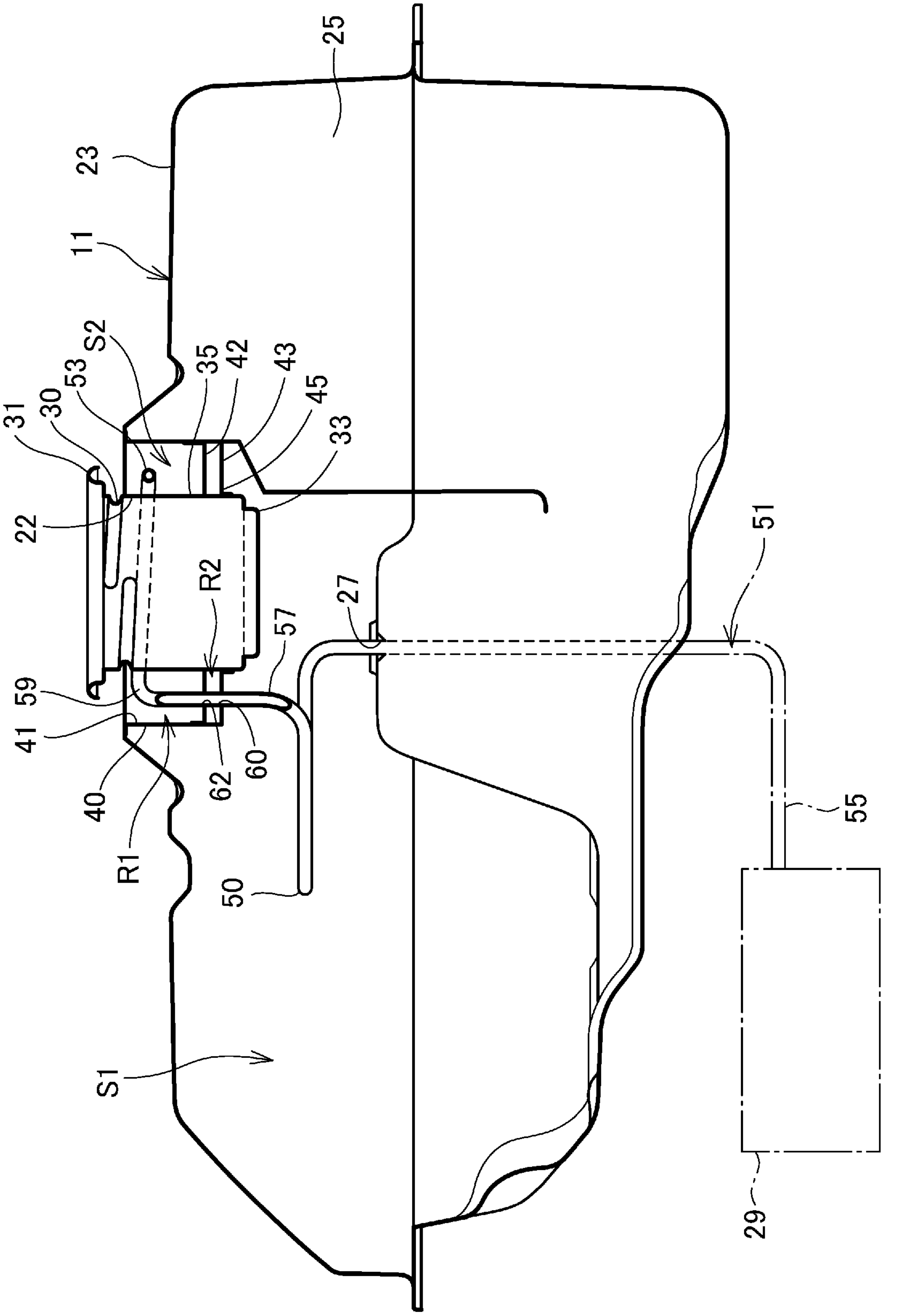
FIG. 2 is a longitudinal cross-sectional view of a fuel tank.
Figure 3:
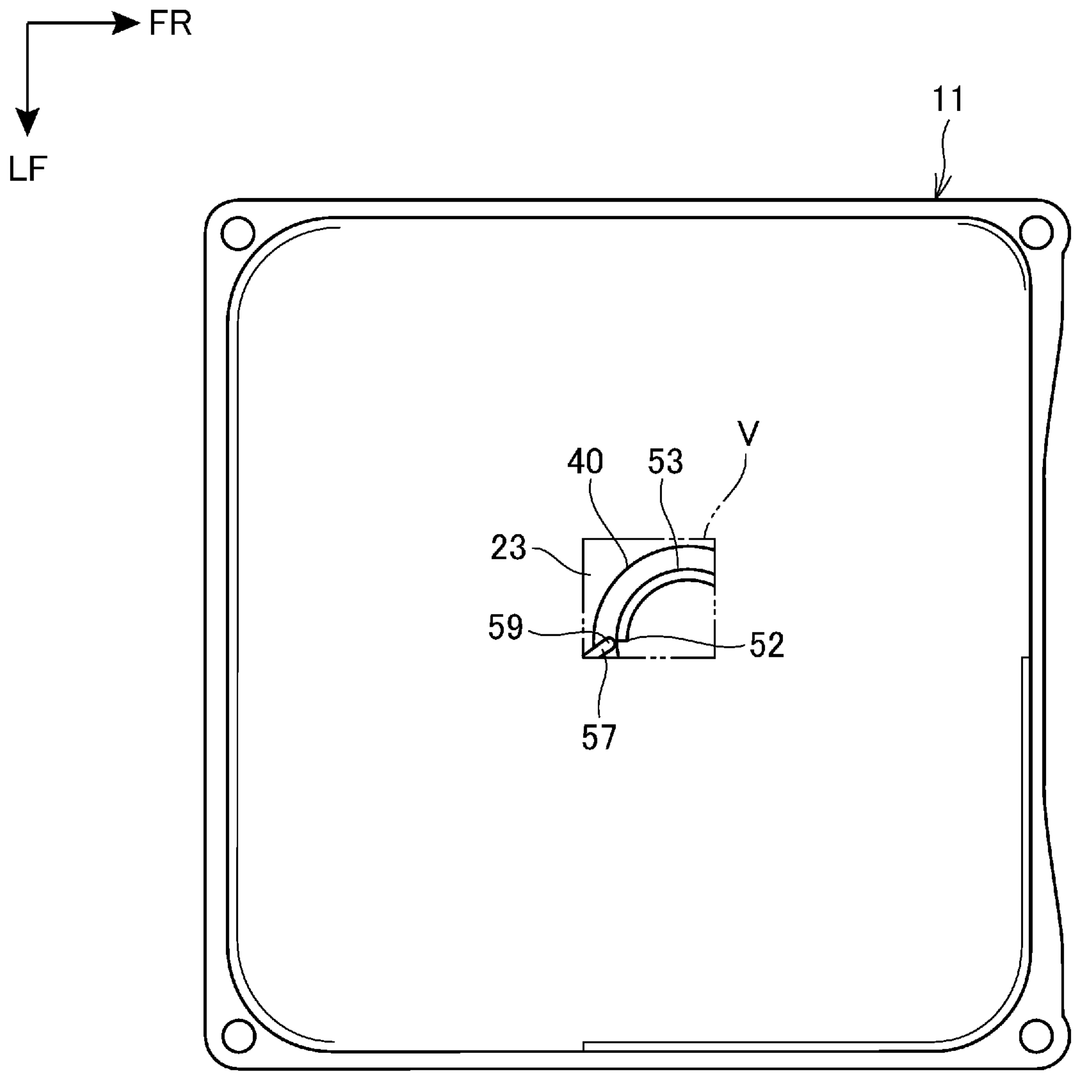
FIG. 3 is a plan view of the fuel tank as viewed from below.

FIG. 2 is a longitudinal cross-sectional view of the fuel tank 11. FIG. 3 is a plan view of the fuel tank 11 as viewed from below. In FIG. 2 and FIG. 3 and the following drawings, UP indicates the upper side, FR indicates the front side, and LH indicates the left side. The directions indicated by these reference signs correspond to the directions of the generator 1 shown in FIG. 1. In FIG. 3, in the area surrounded by an imaginary line V, an inside of the fuel tank 11 is transparently shown.

As shown in FIG. 2, the fuel tank 11 has a flat shape extending along the front-rear direction of the generator 1 in a side view. As shown in FIG. 3, the fuel tank 11 has a substantially square shape in a plan view. The fuel tank 11 includes the internal space S1 in which the liquid fuel can be stored.

As shown in FIG. 2, the fuel tank 11 is provided with a pipe member 50. The pipe member 50 is a tubular member with the opposite ends opened, and the pipe member 50 is a member allowing the internal space S1 of the fuel tank 11 and the outside of the fuel tank 11 to communicate with each other. The inside of the pipe member 50 functions as a breather path 51 for flowing an evaporated fuel, which is a fuel turned into a gas form through vaporization, in the internal space S1 and releasing the evaporated fuel to the outside of the fuel tank 11.

An end part 53 on one side of the pipe member 50 is disposed in the internal space S1 of the fuel tank 11 and an end part 55 on the other side of the pipe member 50 is coupled to a canister 29.

The canister 29 collects the evaporated fuel by causing the evaporated fuel vaporized in the internal space S1 of the fuel tank 11 to be absorbed by activated carbon to be accumulated.

The evaporated fuel absorbed in the canister 29 is supplied to the engine 12 via an air cleaner provided in the generator 1.

Next, the structure of the fuel tank 11 will be described in detail.

As shown in FIG. 2, a top face 23 of the fuel tank 11 is provided with an opening 22, and the fuel pipe 30 that is a cylindrical member is inserted through the opening 22. An upper end 31 of the fuel pipe 30 projects to the outside of the fuel tank 11 and an opening of the upper end 31 of the fuel pipe 30 functions as a fuel inlet. Inside the fuel tank 11, the lower end 33 side of the fuel pipe 30 extends toward a bottom portion of the fuel tank 11, with a predetermined width dimension.

Note that in the present embodiment, when a liquid fuel in an amount assumed to be the upper limit of the liquid fuel that can be refueled to the generator 1, that is, a liquid fuel in a specified amount is input to the fuel tank 11, the liquid level of the liquid fuel stored in the internal space S1 is positioned below the lower end 33 of the fuel pipe 30.

Figure 4:
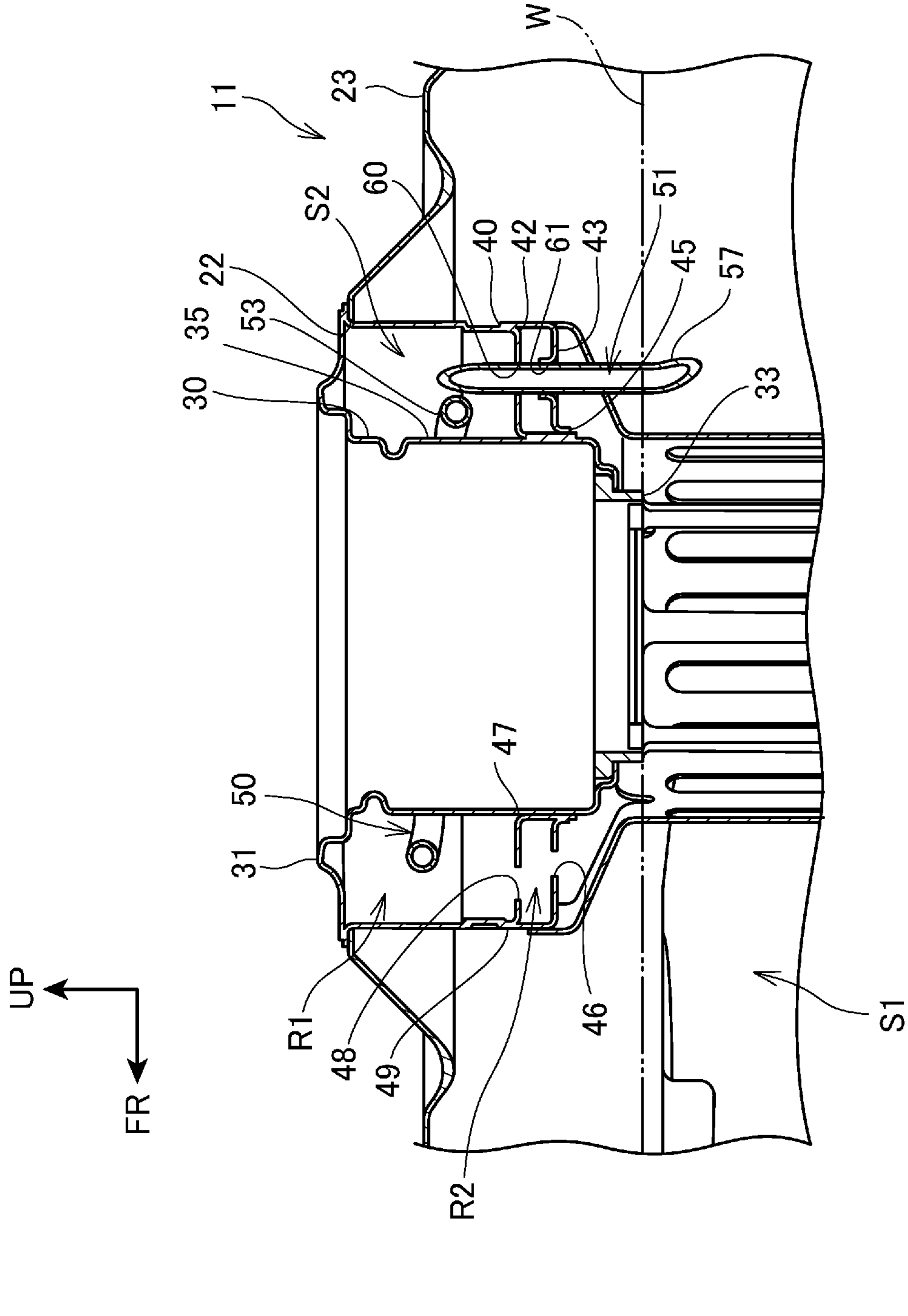
FIG. 4 is an enlarged longitudinal cross-sectional view showing a fuel pipe 30 of a fuel tank 11.

FIG. 4 is an enlarged longitudinal cross-sectional view showing the fuel pipe 30 of the fuel tank 11. In FIG. 4, an imaginary line W indicates a liquid level of a liquid fuel when the liquid fuel is refueled to the internal space S1 in an amount in which the liquid fuel reaches the lower end 33 of the fuel pipe 30.

As shown in FIG. 4, the inside of the fuel tank 11 is provided with an isolated body 40. The isolated body 40 is a cylindrical member surrounding an outer circumferential surface 35 of the fuel pipe 30. An upper end 41 of the isolated body 40 is coupled to the top face 23 of the fuel tank 11 and a lower end side of the isolated body 40 is folded toward the fuel pipe 30 over the entire circumference. On the lower end side of the isolated body 40, a portion folded toward the fuel pipe 30 forms a bottom surface 43 of the isolated body 40. A lower end 45 of the isolated body 40 is coupled to the outer circumferential surface 35 of the fuel pipe 30.

The lower end 33 of the fuel pipe 30 is positioned below the bottom surface 43. That is, the lower end 33 projects toward a lower side of the fuel tank 11 from the bottom surface 43 of the isolated body 40, with a predetermined width dimension.

In the fuel tank 11, an isolated space S2 surrounded by the isolated body 40, the outer circumferential surface 35 of the fuel pipe 30, and the top face 23 of the fuel tank 11 is formed. The isolated space S2 is isolated from the internal space S1 by the isolated body 40.

The isolated space S2 is provided with a partition wall 42 that partitions the isolated space S2 into two spaces. The partition wall 42 is an annularly formed flat plat member through which the fuel pipe 30 can be inserted. In the partition wall 42, an inner periphery 47 is coupled to the outer circumferential surface 35 of the fuel pipe 30 over the entire circumference, and an outer periphery 49 is coupled to an inner side surface of the isolated body 40 over the entire circumference.

The isolated space S2 is partitioned by the partition wall 42, so that upper and lower two spaces, which are a breather room R1 and a chamber room R2, are formed in the isolated space S2. The breather room R1 is provided on the top face 23 side of the fuel tank 11 and the chamber room R2 is provided below the breather room R1, in other words, the lower end 33 side of the fuel pipe 30.

The partition wall 42 is provided at a position closer to the bottom surface 43 side of the isolated body 40 than the top face 23 in the up-down direction of the fuel tank 11. Therefore, in the isolated space S2, the breather room R1 is formed as a space larger than the chamber room R2 by the partition wall 42.

The bottom surface 43 of the isolated body 40 is provided with a ventilation hole 46 and the partition wall 42 is provided with an inflow hole 48. The ventilation hole 46 allows the internal space S1 and the chamber room R2 to communicate with each other and the inflow hole 48 allows the chamber room R2 and the breather room R1 to communicate with each other. Note that the ventilation hole 46 and the inflow hole 48 are preferably provided at positions where the ventilation hole 46 and the inflow hole 48 do not overlap with each other in a plan view of the fuel tank 11.

As stated above, when the liquid fuel in a specified amount is refueled to the generator 1, the liquid level of the liquid fuel stored in the internal space S1 is positioned below the lower end 33 of the fuel pipe 30.

When the fuel in an amount equal to or greater than the specified amount is input to the fuel tank 11, the lower end 33 is blocked by the liquid level of the liquid fuel stored in the internal space S1. As a result, when the liquid fuel is further input to the fuel tank 11, the air in the internal space S1 of the fuel tank 11 and the liquid fuel input to the fuel tank 11 are not exchanged, whereby the liquid fuel is stored inside the fuel pipe 30 without flowing into the internal space S1. In other words, in the generator 1 in the installed state, the positioning of the liquid level of the liquid fuel in the internal space S1 above W is suppressed.

Further, in the generator 1, the liquid fuel is stored inside the fuel pipe 30 without flowing into the internal space S1, so that the input of the liquid fuel in an amount equal to or greater than the specified amount into the fuel tank 11 can be indicated to a user who inputs the liquid fuel.

As stated above, the lower end 33 of the fuel pipe 30 projects toward a lower side of the fuel tank 11 from the bottom surface 43 of the isolated body 40, with a predetermined width dimension. In other words, the bottom surface 43 of the isolated body 40 is positioned above the lower end 33. In this manner, in the generator 1 in the installed state, reaching of the liquid level of the liquid fuel in the internal space S1 to the bottom surface 43 is suppressed. Therefore, in the generator 1 in the installed state, the inflow of the liquid fuel into the chamber room R2 through the ventilation hole 46 is suppressed and in the fuel tank 11, the inflow of the liquid fuel into the chamber room R2 and the isolated space S2 of the isolated body 40 from the internal space S1 is suppressed.

As shown in FIG. 4, the pipe member 50 is inserted through a communication hole 27 provided on a side face 25 of the fuel tank 11, so that a part of each member is disposed in the internal space S1. The pipe member 50 disposed in the internal space S1 is routed toward the isolated body 40 and is inserted through an insertion hole 60 and an insertion hole 62 that are respectively provided in the bottom surface 43 of the isolated body 40 and the partition wall 42. Further, the end part 53 on one side of the pipe member 50 is accommodated in the breather room R1. The pipe member 50 inserted through the insertion hole 60 and the insertion hole 62 is disposed so as to linearly extend along the longitudinal direction of the fuel pipe 30 inside the chamber room R2 and the breather room R1. Hereinafter, a portion of the pipe member 50 that is disposed so as to linearly extend is referred to as a linear part 57.

Figure 5:
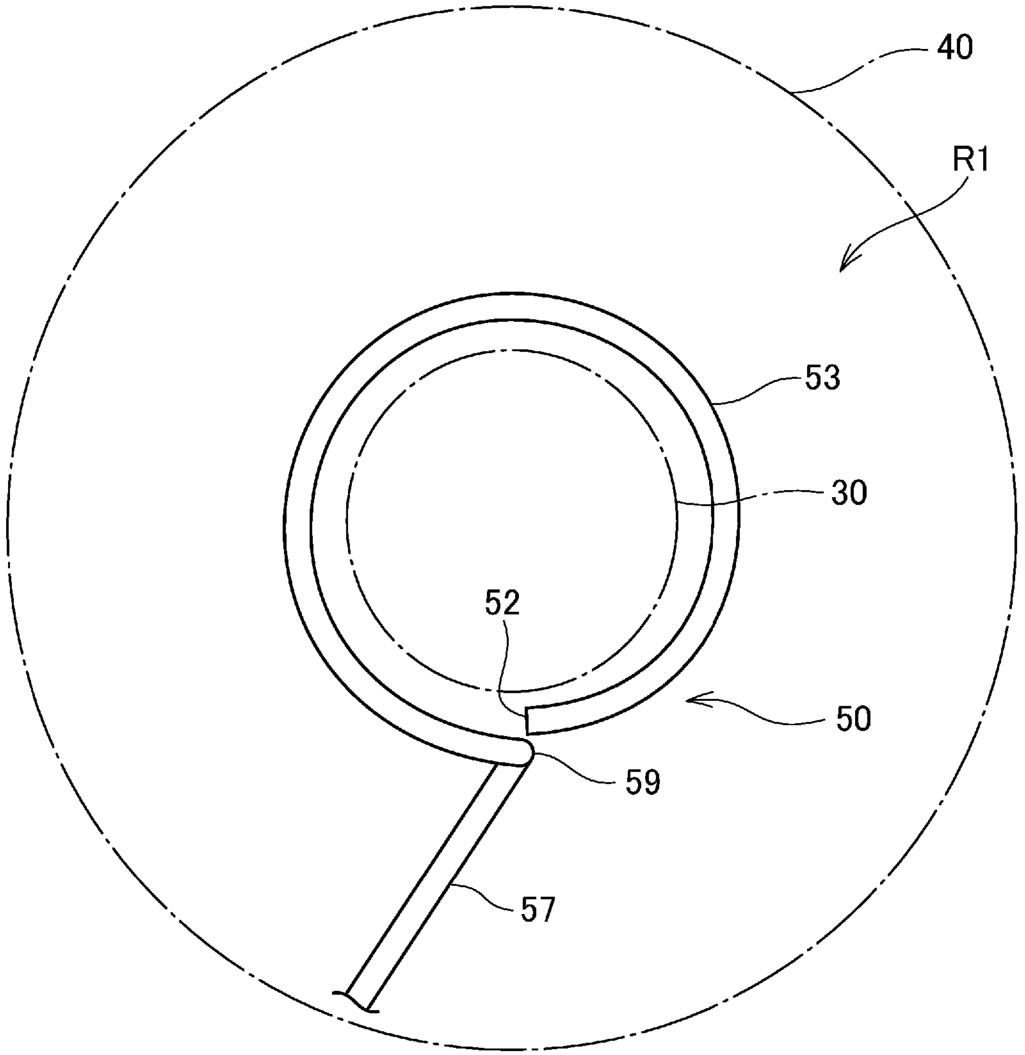
FIG. 5 is a plan view showing an end part of a pipe member.
Figure 6:
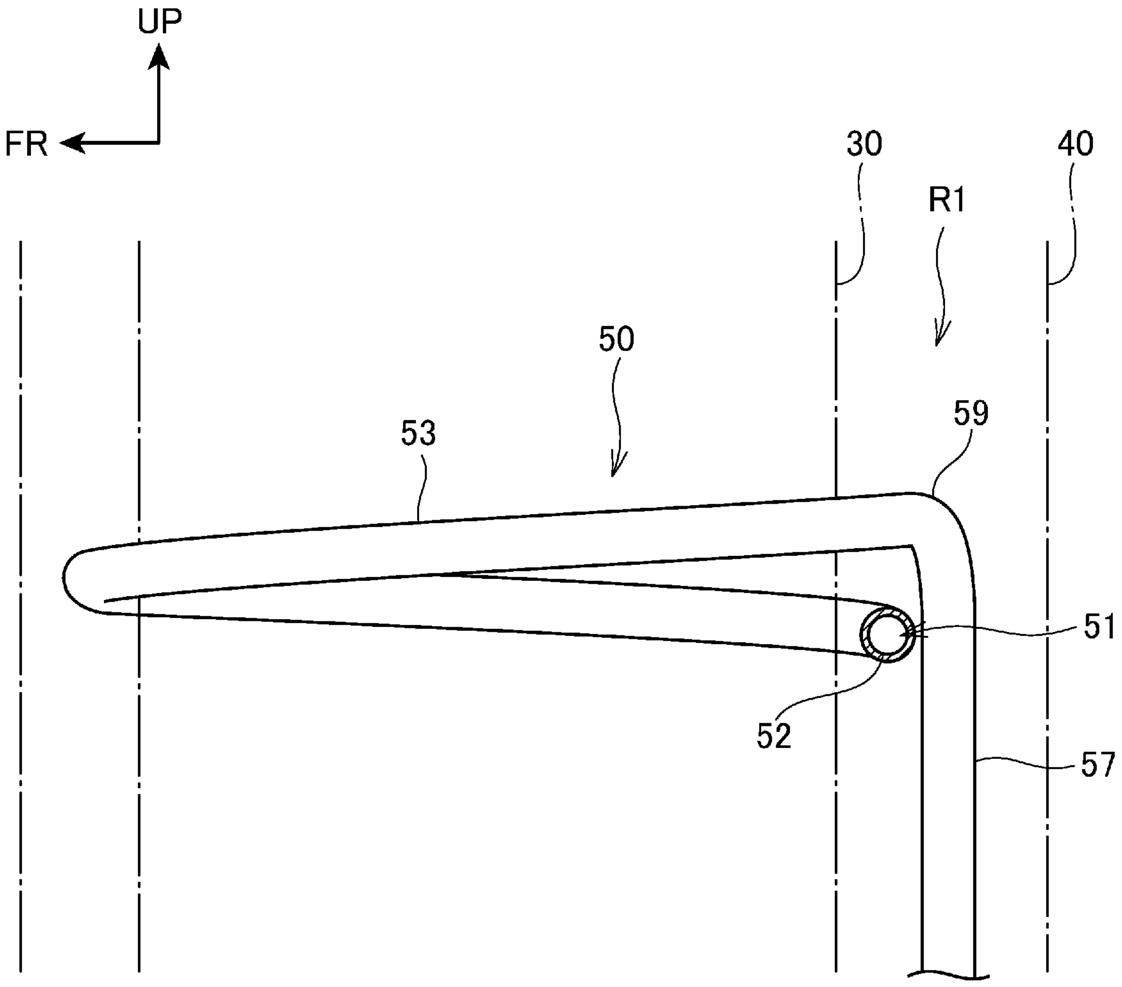
FIG. 6 is a view showing the end part of the pipe member.

FIG. 5 is a plan view showing the end part 53 on one side of the pipe member 50. FIG. 6 is a view showing the end part 53 on one side of the pipe member 50.

As shown in FIG. 5 and FIG. 6, the end part 53 accommodated in the breather room R1 is bent from the linear part 57 and is then annularly bent so as to surround the outer circumferential surface 35 of the fuel pipe 30. Hereinafter, a portion of the pipe member 50 that is bent from the linear part 57 is referred to as a bent part 59.

In the present embodiment, the end part 53 is wound around the fuel pipe 30 so as to round once along the outer circumferential surface 35 of the fuel pipe 30. In this manner, an opening end 52 where an opening on one side of the pipe member 50 is provided is disposed adjacent to the linear part 57 and the bent part 59 as a starting position of the end part 53 annularly bent surrounding the outer circumferential surface 35 of the fuel pipe 30.

As shown in FIG. 6, the opening end 52 is disposed below the bent part 59. That is, the end part 53 annularly bent is formed in a so-called spiral shape raised toward the bent part 59 from the opening end 52.

As shown in FIG. 4, the opening end 52 of the pipe member 50 is disposed at substantially the center of the fuel tank 11 in a plan view of the fuel tank 11.

Note that the opening end 52 is preferably provided at a position where the opening end 52 does not overlap with the inflow hole 48 in a plan view of the fuel tank 11.

Next, a flow of an evaporated fuel in the generator 1 will be described.

In the generator 1 in the installed state, the liquid fuel stored in the internal space S1 of the fuel tank 11 is occasionally vaporized to become an evaporated fuel in a gas form. The evaporated fuel flows into the chamber room R2 of the isolated space S2 from the internal space S1 via the ventilation hole 46 and flows into the breather room R1 from the chamber room R2 via the inflow hole 48.

The evaporated fuel that has reached the breather room R1 flows into the breather path 51 through the opening end 52 of the pipe member 50 and passes through the breather path 51 to be released to the outside of the fuel tank 11.

As stated above, in the generator 1 in the installed state, reaching of the liquid level of the liquid fuel in the internal space S1 to the bottom surface 43 is suppressed. As a result, blocking of the ventilation holes 46 by the liquid fuel input to the internal space S1 is suppressed and blocking of the release of the evaporated fuel from the internal space S1 of the fuel tank 11 is suppressed.

When the generator 1 is used, there is a possibility that the generator 1 is inclined or topples over in the front, rear, left, and right directions from the installed state. In such a case, there is a possibility that similarly to the evaporated fuel, the liquid fuel input into the internal space S1 flows into the isolated space S2 and the breather path 51 and leaks to the outside of the fuel tank 11 via the breather path 51.

In the present embodiment, in addition to the breather room R1 where the end part 53 on one side of the pipe member 50 is disposed, the chamber room R2 is provided. In addition, the ventilation hole 46 and the inflow hole 48 are provided at positions where the ventilation hole 46 and the inflow hole 48 do not overlap with each other, and the inflow hole 48 and the opening end 52 are provided at positions where the inflow hole 48 and the opening end 52 do not overlap with each other in a plan view of the fuel tank 11. In this manner, in the isolated space S2 of the isolated body 40, a so-called labyrinth structure is formed by the breather room R1, the chamber room R2, the ventilation hole 46, and the inflow hole 48.

In this manner, in the generator 1, even when the generator 1 is inclined or topples over in any of the front, rear, left, and right directions from the installed state, reaching of the liquid fuel to the opening end 52 is suppressed. Therefore, in the generator 1, the leakage of the liquid fuel input into the internal space S1 to the outside of the fuel tank 11 is suppressed.

As stated above, the end part 53 annularly bent is formed in a spiral shape lowered toward the opening end 52 from the bent part 59. In the generator 1, even when the generator 1 is inclined or topples over in any of the front, rear, left, and right directions from the installed state and whereby the liquid fuel flows into the end part 53, the generator 1 is returned to the installed state again, and thus, the liquid fuel flown into the end part 53 flows down along the end part 53 and is discharged from the opening end 52.

In this manner, in the generator 1, the leakage of the liquid fuel input into the internal space S1 to the outside of the fuel tank 11 is suppressed.

As shown in FIG. 4, the opening end 52 of the pipe member 50 is disposed at substantially the center of the fuel tank 11 in a plan view of the fuel tank 11. In this manner, when at least the liquid fuel stored in the fuel tank 11 is fewer than the specified amount, for example, half of the specified amount, even in a case where the generator 1 is inclined or topples over in any of the front, rear, left, and right directions from the installed state, positioning of the opening end 52 of the pipe member 50 below the liquid level of the liquid fuel stored in the fuel tank 11 is suppressed.

As stated above, in the present embodiment, the end part 53 of the pipe member 50 is wound around the fuel pipe 30 so as to round once along the outer circumferential surface 35 of the fuel pipe 30 and is annularly bent.

In the generator 1, when at least the liquid fuel stored in the fuel tank 11 is fewer than the specified amount, even in a case where the generator 1 is inclined or topples over in any of the front, rear, left, and right directions from the installed state, positioning of the end part 53 of the pipe member 50 below the liquid level of the liquid fuel stored in the fuel tank 11 is suppressed. That is, in such a case, any portion of the end part 53 is disposed above the liquid level of the liquid fuel stored in the fuel tank 11.

In this manner, even when the liquid fuel stored in the fuel tank 11 flows into the breather path 51 from the opening end 52, in the end part 53, the fuel needs to move to an upper side relative to the liquid level of the liquid fuel before reaching the bent part 59 from the opening end 52. Therefore, in the generator 1, reaching of the liquid fuel flown into the breather path 51 from the opening end 52 to the bent part 59 is suppressed, and the leakage of the liquid fuel input into the internal space S1 to the outside of the fuel tank 11 is suppressed.

As described above, according to the present embodiment, the fuel tank 11 includes the fuel inlet and the breather path 51 formed of the pipe member 50 communicating between the inside and the outside of the fuel tank 11, and the isolated body 40 forming the isolated space S2 that is isolated from the internal space S1 of the fuel tank 11 is provided inside the fuel tank 11. The isolated body 40 is provided with the breather room R1 and the chamber room R2 that are formed by partitioning the isolated space S2 by the partition wall 42, the ventilation hole 46 allowing the internal space S1 and the chamber room R2 to communicate with each other, and the inflow hole 48 allowing the breather room R1 and the chamber room R2 to communicate with each other. Further, the end part 53 on one side of the pipe member 50 is disposed inside the breather room R1.

In this manner, in the generator 1, the labyrinth structure is formed from the internal space S1 leading to the end part 53 on one side of the pipe member 50, and even when the generator 1 is inclined or topples over in any of the front, rear, left, and right directions from the installed state, reaching of the liquid fuel to the opening end 52 is suppressed. Therefore, in the generator 1, the leakage of the liquid fuel input into the internal space S1 to the outside of the fuel tank 11 is suppressed.

Further, according to the present embodiment, the end part 53 on one side of the pipe member 50 is bent in a spiral shape raised toward the end part 55 side on the other side from the distal end of the end part 53 on one side of the pipe member 50.

In this manner, in the generator 1, even when the liquid fuel flows into the end part 53, the generator 1 is returned to the installed state again, so that the liquid fuel flown into the end part 53 flows down along the end part 53 and is discharged from the opening end 52.

Therefore, in the generator 1, the leakage of the liquid fuel input into the internal space S1 to the outside of the fuel tank 11 is suppressed.

Further, according to the present embodiment, the fuel tank 11 is provided with the fuel pipe 30 coupled to the fuel inlet and extending toward the internal space S1 of the fuel tank 11, and the fuel inlet is provided on the top face 23 of the fuel tank 11. The isolated space S2 is provided by being surrounded by the isolated body 40, the fuel pipe 30, and the top face 23 of the fuel tank 11, and the breather room R1 is disposed above the lower end 33 of the fuel pipe 30.

In this manner, when the fuel in an amount equal to or greater than the specified amount is input to the fuel tank 11, the lower end 33 is blocked by the liquid level of the liquid fuel stored in the internal space S1. As a result, in the generator 1 in the installed state, positioning of the liquid level of the liquid fuel in the internal space S1 above W is suppressed.

Further, according to the present embodiment, the opening end 52 of the end part 53 on one side of the pipe member 50 is disposed at substantially the center of the fuel tank 11 in a plan view of the fuel tank 11.

In this manner, when at least the liquid fuel stored in the fuel tank 11 is fewer than the specified amount, for example, half of the specified amount, even in a case where the generator 1 is inclined or topples over, positioning of the opening end 52 of the pipe member 50 below the liquid level of the liquid fuel store in the fuel tank 11 is suppressed. Therefore, in the generator 1, the leakage of the liquid fuel input into the internal space S1 to the outside of the fuel tank 11 is suppressed.

The aforementioned embodiment is an exemplary illustration of one aspect of the present invention, and any modification and application are available without departing from the gist of the present invention.

Figure 7:
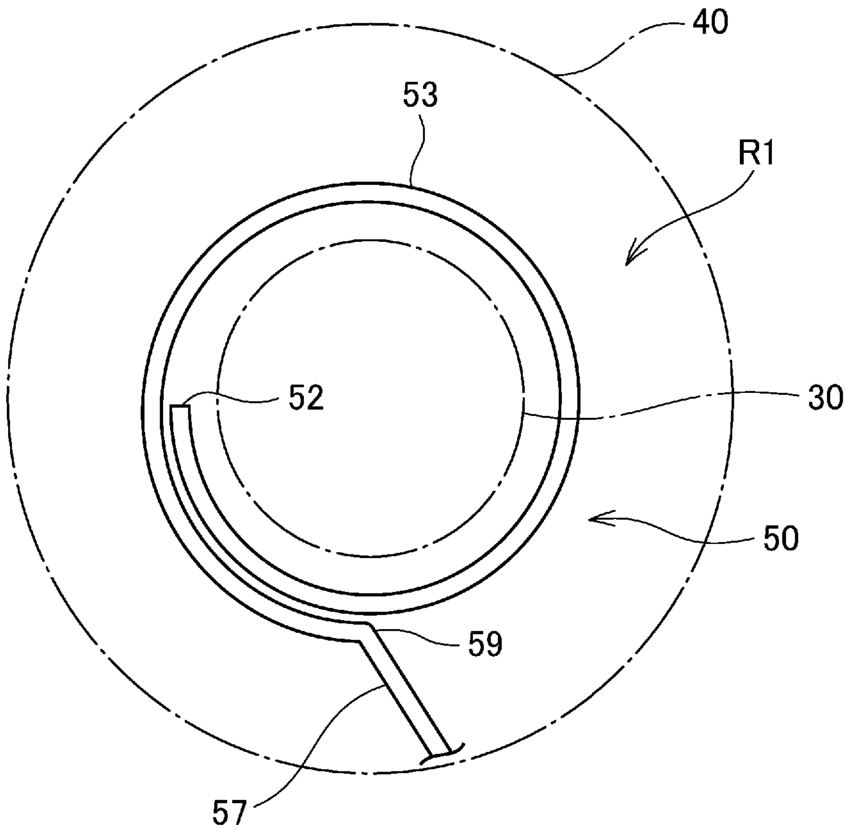
FIG. 7 is a plan view showing the end part of the pipe member according to a modification.

In the aforementioned embodiment, the end part 53 is wound around the fuel pipe 30 so as to round once along the outer circumferential surface 35 of the fuel pipe 30. However, without being limited to the aforementioned embodiment, as shown in FIG. 7, the end part 53 may be wound around the fuel pipe 30 so as to round more than once along the outer circumferential surface 35 of the fuel pipe 30.

Configurations Supported by the Aforementioned Embodiment

The aforementioned embodiment supports the following configurations.

(Configuration 1) A generator including a fuel tank that stores a liquid fuel, the fuel tank having a fuel inlet and a breather path formed of a pipe member communicating between an inside and an outside of the fuel tank, in which an isolated body forming an isolated space that is isolated from an internal space of the fuel tank is provided inside the fuel tank, the isolated body is provided with a breather room and a chamber room that are formed by partitioning the isolated space by a partition wall, a ventilation hole allowing the internal space and the chamber room to communicate with each other, and an inflow hole allowing the breather room and the chamber room to communicate with each other, and an end part on one side of the pipe member is disposed inside the breather room.

According to this configuration, in the generator, a labyrinth structure is formed from the internal space leading to the end part on one side of the pipe member, and even when the generator is inclined or topples over in any of the front, rear, left, and right directions from the installed state, reaching of the liquid fuel to the end part on one side of the pipe member is suppressed. Therefore, in the generator, the leakage of the liquid fuel input into the internal space to the outside of the fuel tank is suppressed.

(Configuration 2) The generator described in Configuration 1, in which the end part on one side of the pipe member is bent in a spiral shape raised toward an end part side on the other side from a distal end of the end part on one side of the pipe member.

According to this configuration, in the generator, even when the liquid fuel flows into the end part on one side of the pipe member, the generator is returned to the installed state again, so that the liquid fuel flown into the end part on one side of the pipe member flows down along the end part and is discharged.

(Configuration 3) The generator described in Configuration 1 or Configuration 2, in which the fuel tank is provided with a cylindrical member coupled to the fuel inlet and extending toward the internal space of the fuel tank, the fuel inlet is provided on a top face of the fuel tank, the isolated space is provided by being surrounded by the isolated body, the cylindrical member, and the top face of the fuel tank, and the breather room is disposed above a lower end of the cylindrical member.

According to this configuration, in the generator in an installed state, positioning of the liquid level of the liquid fuel in the internal space of the fuel tank above the cylindrical member is suppressed, so that the leakage of the liquid fuel input to the internal space to the outside of the fuel tank via the pipe member is suppressed.

(Configuration 4) The generator described in Configuration 1 to Configuration 3, in which the distal end of the end part on one side of the pipe member is disposed at substantially the center of the fuel tank in a plan view of the fuel tank.

According to this configuration, even in a case where the generator is inclined or topples over, positioning of an opening end of the pipe member below the liquid level of the liquid fuel stored in the fuel tank is suppressed, so that the leakage of the liquid fuel input into the internal space to the outside of the fuel tank is suppressed.

REFERENCE SIGNS LIST

1 generator
11 fuel tank
12 engine
23 top face
30 fuel pipe (cylindrical member)
35 outer circumferential surface
40 isolated body
42 partition wall
43 bottom surface
46 ventilation hole
48 inflow hole
50 pipe member
51 breather path
52 opening end (distal end)
53, 55 end part
57 linear part
59 bent part
R1 breather room
R2 chamber room
S1 internal space
S2 isolated space
V, W imaginary line

The invention claimed is:

1. A generator comprising a fuel tank that stores a liquid fuel, the fuel tank including:
a fuel inlet; and
a breather path formed of a pipe member communicating between an inside and an outside of the fuel tank,
wherein
an isolated body forming an isolated space that is isolated from an internal space of the fuel tank is provided inside the fuel tank,
the isolated body is provided with a breather room and a chamber room that are formed by partitioning the isolated space by a partition wall, a ventilation hole allowing the internal space and the chamber room to communicate with each other, and an inflow hole allowing the breather room and the chamber room to communicate with each other,
an end part on one side of the pipe member is disposed inside the breather room, and
the end part on the one side of the pipe member is bent in a spiral shape raised toward an end part side on another side from a distal end of the end part on the one side of the pipe member.

2. The generator according to claim 1, wherein the fuel tank is provided with a cylindrical member coupled to the fuel inlet and extending toward the internal space of the fuel tank,
the fuel inlet is provided on a top face of the fuel tank,
the isolated space is provided by being surrounded by the isolated body, the cylindrical member, and the top face of the fuel tank, and
the breather room is disposed above a lower end of the cylindrical member.

3. The generator according to claim 1, wherein, the distal end of the end part on the one side of the pipe member is disposed at substantially a center of the fuel tank in a plan view of the fuel tank.

4. The generator according to claim 2, wherein, the distal end of the end part on the one side of the pipe member is disposed at substantially a center of the fuel tank in a plan view of the fuel tank.

* * * * *